(12) United States Patent
Russell et al.

(10) Patent No.: US 6,877,279 B2
(45) Date of Patent: Apr. 12, 2005

(54) SEALING APPARATUS FOR A CLOSURE

(75) Inventors: Stephen Russell, Plain City, OH (US); Kenichi Kitayama, Dublin, OH (US); John Barlow, Jr., Marysville, OH (US)

(73) Assignee: Honda Motor Company, Ltd., Tokyo (JP)

(*) Notice: Subject to any disclaimer, the term of this patent is extended or adjusted under 35 U.S.C. 154(b) by 0 days.

(21) Appl. No.: 10/222,529

(22) Filed: Aug. 16, 2002

(65) Prior Publication Data

US 2004/0031203 A1 Feb. 19, 2004

(51) Int. Cl.$^7$ ................................................ E06B 7/22
(52) U.S. Cl. ....................................................... 49/498.1
(58) Field of Search ........................... 49/498.1, 475.1, 49/490.1

(56) References Cited

U.S. PATENT DOCUMENTS

| | | | | |
|---|---|---|---|---|
| 1,928,992 A | * | 10/1933 | Clark et al. ................. 138/103 |
| 2,263,806 A | * | 11/1941 | Hammerl ..................... 49/498.1 |
| 2,702,416 A | * | 2/1955 | Bright ......................... 49/490.1 |
| 3,167,825 A | * | 2/1965 | Zoller ........................ 49/490.1 |
| 3,952,455 A | * | 4/1976 | McAlarney ................. 49/496.1 |
| 4,448,430 A | * | 5/1984 | Bright .......................... 277/642 |
| 4,549,761 A | | 10/1985 | Lee et al. |
| 4,926,600 A | * | 5/1990 | Mesnel ....................... 49/490.1 |
| 5,042,200 A | | 8/1991 | Ugawa |
| 5,154,952 A | | 10/1992 | Nozaki |
| 5,258,157 A | * | 11/1993 | Nozaki et al. ............... 264/261 |
| 5,307,591 A | | 5/1994 | Usuta et al. |
| 5,331,768 A | | 7/1994 | Takeuchi |
| 5,347,758 A | | 9/1994 | Yamane |
| 5,462,292 A | | 10/1995 | Yamane |
| 5,511,343 A | * | 4/1996 | Guillon ....................... 49/479.1 |
| 5,538,578 A | | 7/1996 | Sugawara et al. |
| 5,622,008 A | * | 4/1997 | King ........................... 49/498.1 |
| 5,664,811 A | | 9/1997 | Martus et al. |
| 5,682,667 A | | 11/1997 | Flagg |
| 5,806,247 A | | 9/1998 | Yamamoto |
| 5,819,472 A | * | 10/1998 | Frost .......................... 49/498.1 |
| 5,918,421 A | | 7/1999 | Nozaki |
| 6,099,068 A | | 8/2000 | Kim |
| 6,119,404 A | * | 9/2000 | Bschorr et al. ............. 49/498.1 |
| 6,131,341 A | | 10/2000 | Wade et al. |
| 6,196,618 B1 | | 3/2001 | Pietryga et al. |
| 6,393,766 B2 | | 5/2002 | Nozaki et al. |
| 6,397,525 B1 | | 6/2002 | Ishibashi et al. |
| 6,530,618 B2 | * | 3/2003 | Nozaki et al. ............. 296/146.9 |
| 6,677,020 B2 | * | 1/2004 | Dron ......................... 428/36.91 |

FOREIGN PATENT DOCUMENTS

| | | |
|---|---|---|
| JP | 9-20142 | 1/1997 |
| JP | 9-20143 | 1/1997 |
| JP | U2602512 | 11/1999 |

* cited by examiner

Primary Examiner—Jerry Redman
(74) Attorney, Agent, or Firm—Dinsmore & Shohl LLP

(57) ABSTRACT

A sealing apparatus for a closure includes an elongated seal strip having a longitudinal length and including a flexible and resilient seal portion defining a substantially hollow cavity. The sealing apparatus further includes a bumper member comprising a bumper element positioned within the cavity. Methods of making a sealing apparatus are also disclosed.

24 Claims, 8 Drawing Sheets

SEALING APPARATUS FOR A CLOSURE

TECHNICAL FIELD

This invention relates generally to sealing apparatus, and more particularly, to sealing apparatus for a closure.

BACKGROUND OF THE INVENTION

In many applications, closures require a substantially fluid tight seal to prevent fluid communication between an interior area and the surrounding environment. For example, vehicle doors typically include weather strips to prevent noise, air, water and/or debris from contaminating the interior space of the vehicle. Vehicle doors also typically include door bumpers that are offset from the weather strip to prevent damage to the doors and/or vehicle body upon closing of the doors. Such bumpers further prevent vibration of the doors during operation of the vehicle. However, offsetting the bumper from the weather strip requires an excessive mounting area and often complicates the manufacture of the vehicle closure assembly.

SUMMARY OF THE INVENTION

Accordingly, it is an object of the present invention to obviate problems and shortcomings of conventional apparatus for closures. More particularly, it is an object of the present invention to provide sealing apparatus for closures and methods of making the same.

In accordance with the present invention, sealing apparatus for closures are provided. Sealing apparatus comprise an elongated seal strip having a longitudinal length and including a flexible and resilient seal portion defining a substantially hollow cavity. Sealing apparatus further comprise a bumper member comprising a preformed bumper element having a length substantially less than the longitudinal length. The preformed bumper element is restrained within the cavity after the preformed bumper element is located adjacent a predetermined position along the longitudinal length of the seal strip through insertion of the preformed bumper element into the cavity.

In accordance with further aspects of the present invention, sealing apparatus comprise an elongated seal strip having a longitudinal length and including a base and a flexible resilient seal portion. The base and the seal portion define a substantially hollow cavity having a cavity height when the seal portion is in an uncompressed orientation. The sealing apparatus further includes a bumper member positioned in the cavity and comprising a bumper element including a dimension which extends substantially the full cavity height when the seal portion is in the uncompressed orientation. The bumper element is attached to only one of the base and the flexible seal portion and extends toward the other of the base and the flexible seal portion when the flexible seal portion is in the uncompressed orientation.

In accordance with still further aspects of the present invention, closure assemblies are provided. Each exemplary closure assembly includes a body structure, a striker, a latch adapted to engage the striker, an elongated seal strip attached to the body structure and a bumper member. The elongated seal strip has a longitudinal length and a flexible and resilient seal portion defining a substantially hollow cavity. The bumper member comprises a preformed bumper element having a length substantially less than the longitudinal length, wherein the preformed bumper element is restrained within the cavity after the preformed bumper element is located at a predetermined position along the longitudinal length of the seal strip adjacent at least one of the striker and the latch through insertion of the preformed bumper element into the cavity.

In accordance with still further aspects of the present invention, methods of making a sealing apparatus are provided. The sealing apparatus includes an elongated seal strip having a longitudinal length and including a flexible and resilient seal portion defining a substantially hollow cavity. The sealing apparatus further includes a bumper member comprising a bumper element having a length substantially less than the longitudinal length. The method of making the sealing apparatus comprises the steps of inserting the bumper element into the cavity at a first end of the elongated seal strip. The bumper element is also moved within the cavity to a predetermined position relative to the elongated seal strip. The bumper element is then attached to the elongated seal strip adjacent the predetermined position.

Still other objects and advantages of the present invention will become apparent to those skilled in the art from the following description wherein there are shown and described alternative exemplary embodiments of this invention. As will be realized, the invention is capable of other different, obvious aspects and embodiments, all without departing from the invention. Accordingly, the drawings and descriptions should be regarded as illustrative in nature and not as restrictive.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE EXEMPLARY EMBODIMENTS

Figure 1:
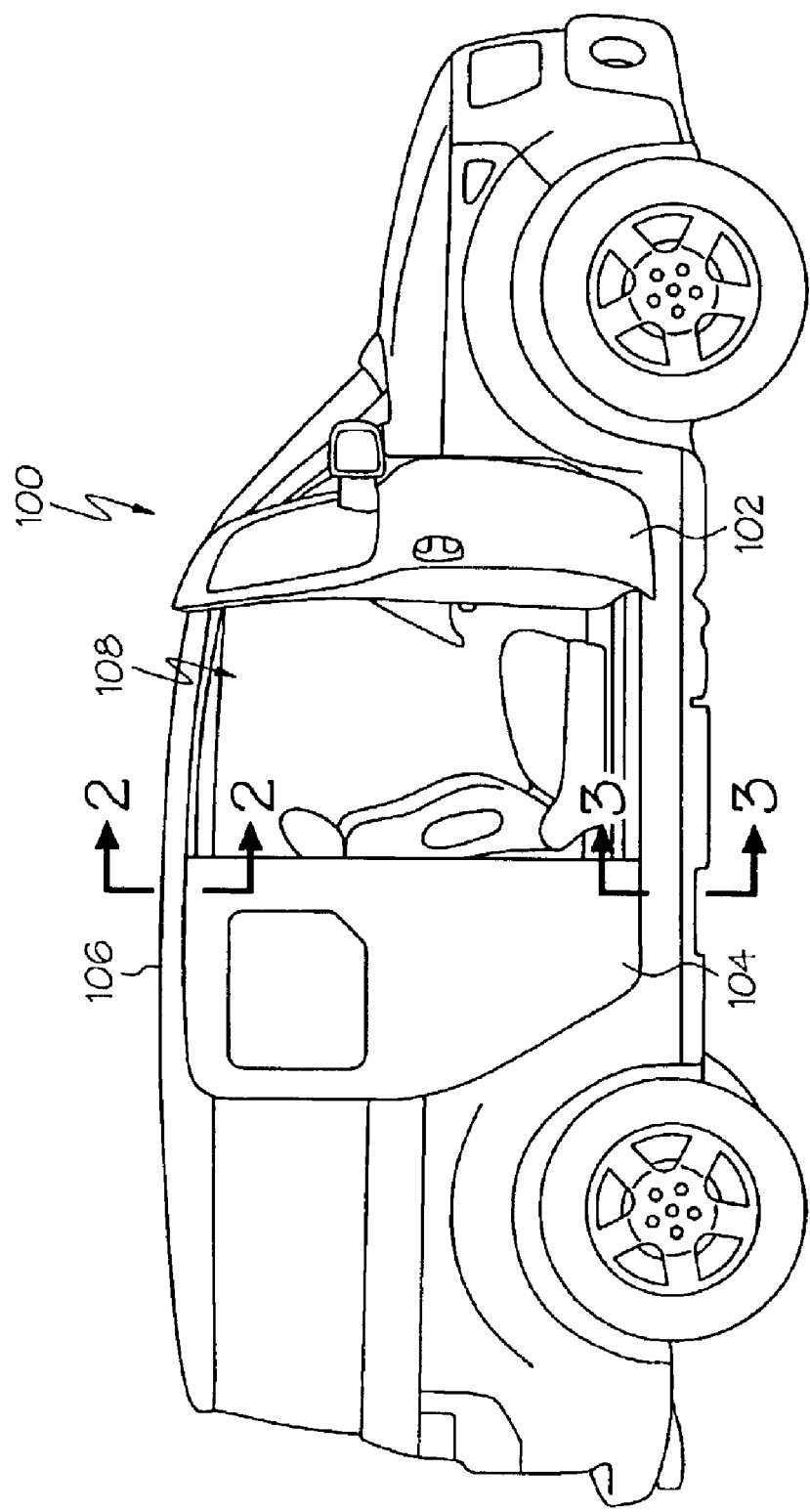
FIG. 1 is an elevational view of a vehicle incorporating a sealing apparatus in accordance with one embodiment of the present invention.
Figure 2:
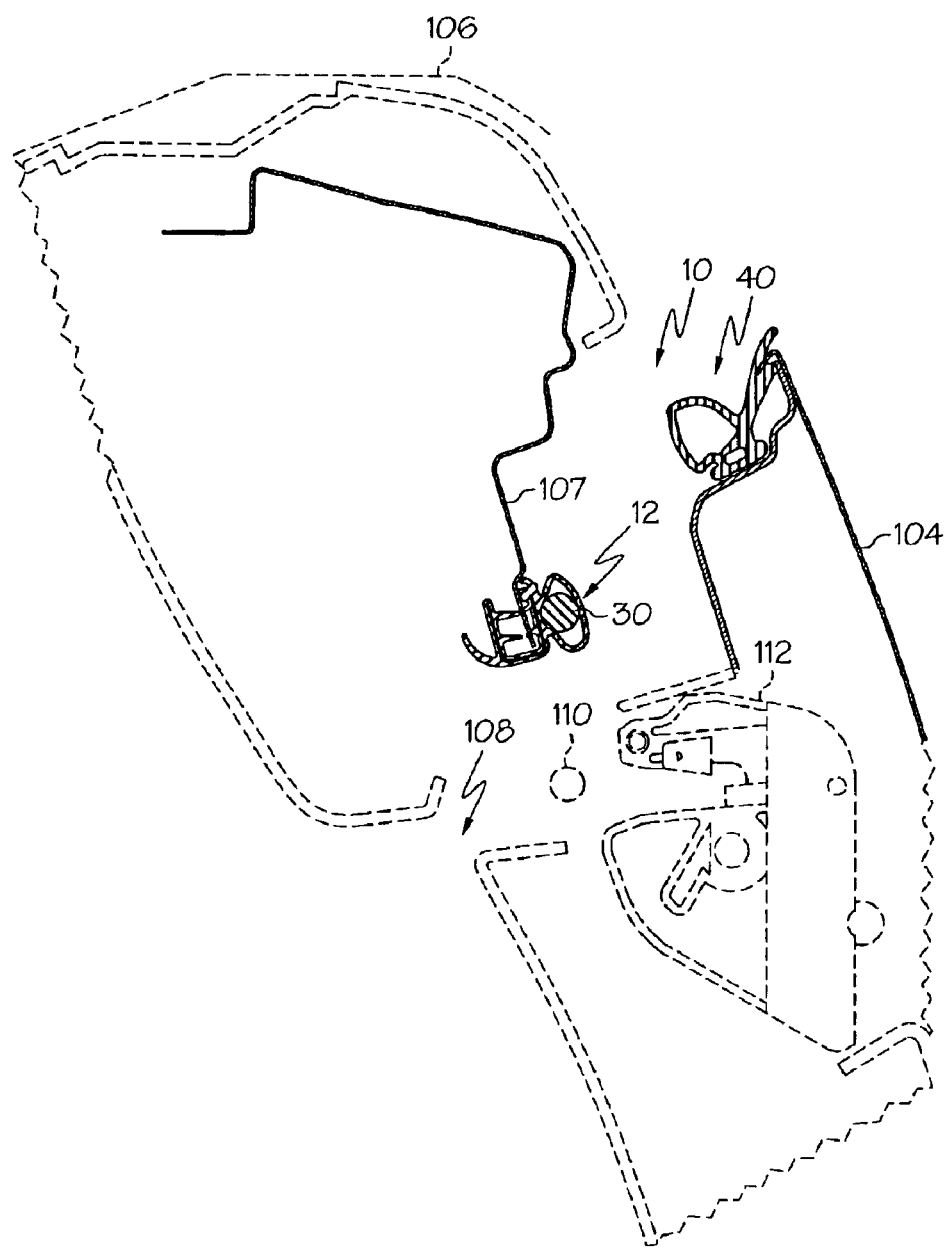
FIG. 2 is a partial sectional view of the body structure of the vehicle along section line 2—2 in FIG. 1.
Figure 3:
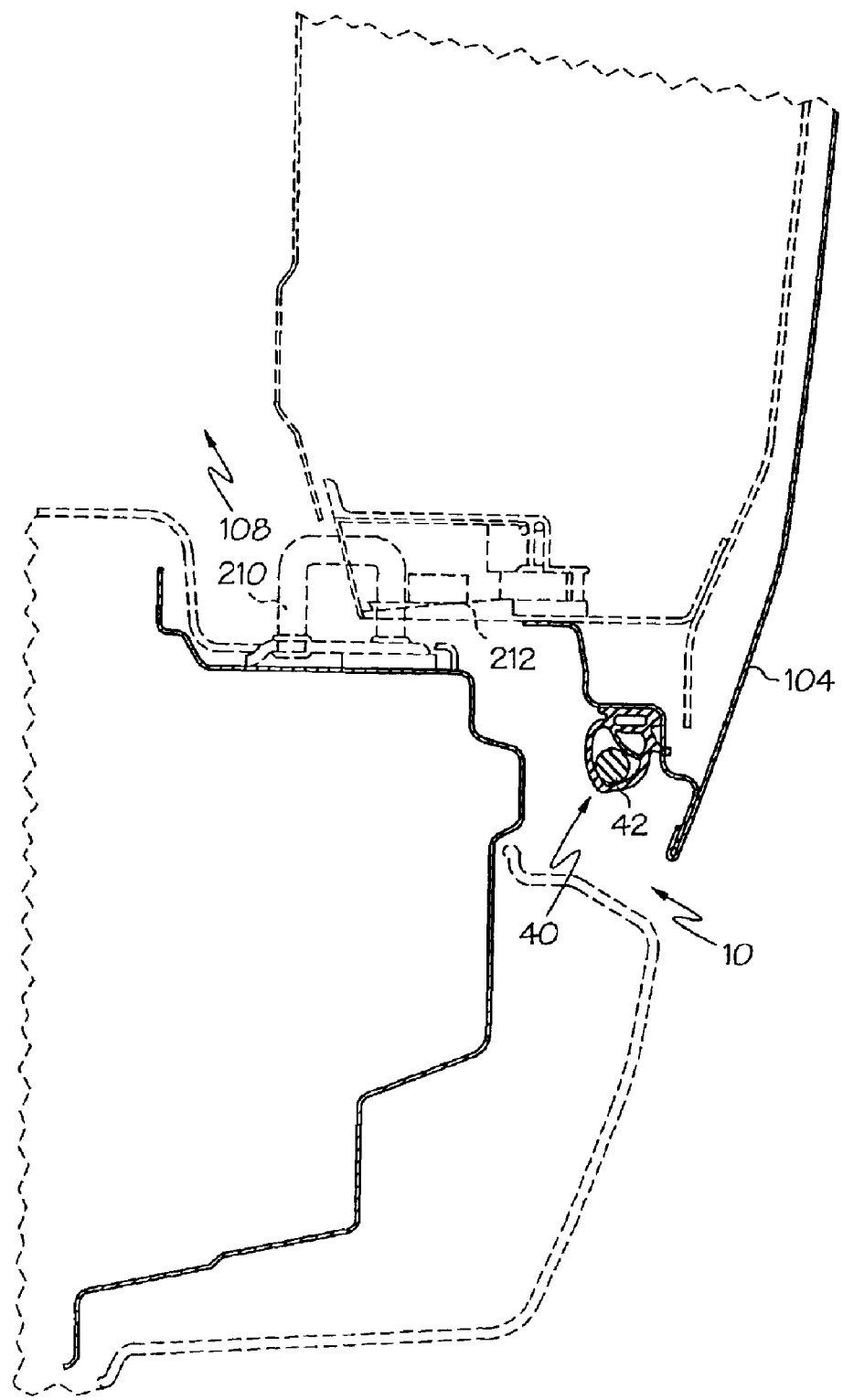
FIG. 3 is a partial sectional view of the body structure of the vehicle along section line 3—3 in FIG. 1.

Turning now to the drawings in detail, wherein like numbers indicate the same or corresponding elements throughout the views, FIG. 1 depicts a vehicle 100 incorporating a sealing apparatus 10 (see FIGS. 2 and 3) in accordance with one exemplary embodiment of the present invention. The exemplary vehicle illustrated includes a front right door 102 having a front portion hinged to the vehicle body 106 and a rear right door 104 having a rear portion hinged to the vehicle body 106. Although not shown, a similar set of doors may be incorporated on the left side of the vehicle. For illustration purposes, the right front door 102 has been opened to reveal the interior space of the vehicle and the right rear door 104 has been partially opened to fully depict the sealing apparatus 10 in its undeformed state. As illustrated in FIGS. 2 and 3 and described more fully below, the exemplary sealing apparatus 10 comprises a body opening side seal apparatus 12 and a door side seal apparatus 40. While two distinct seal apparatus 12, 40 are shown, it is understood that a single seal apparatus or any plurality of seal apparatus may be used in accordance with the inventive concepts of the present invention.

Figure 6:
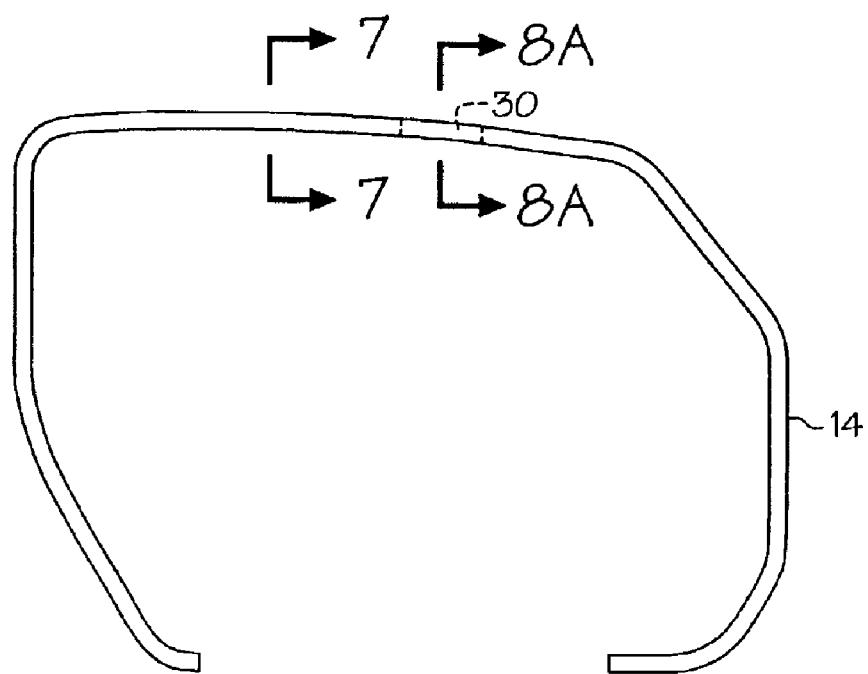
FIG. 6 is an exemplary sealing apparatus in accordance with the present invention.

In one exemplary embodiment of the present invention, as shown in FIG. 2, a body opening side seal apparatus 12 is mounted on a body frame 107 of the vehicle body 106 that at least partially circumscribes the body opening 108 of the vehicle. In certain exemplary embodiments of the present invention, the body opening side seal apparatus 12 completely surrounds the body opening 108. However, in alternate exemplary embodiments, as best illustrated in FIG. 6, for example, the body opening side seal apparatus 12 has the general shape of the body opening 108 except that the lower segment has been removed to accommodate the door threshold. An exemplary embodiment of the body opening side seal apparatus 12 in accordance with the present invention provides a substantially fluid tight seal to reduce and/or prevent contamination of the interior vehicle area with noise, debris, water, and/or air having an undesirable temperature and/or odor.

Figure 7:
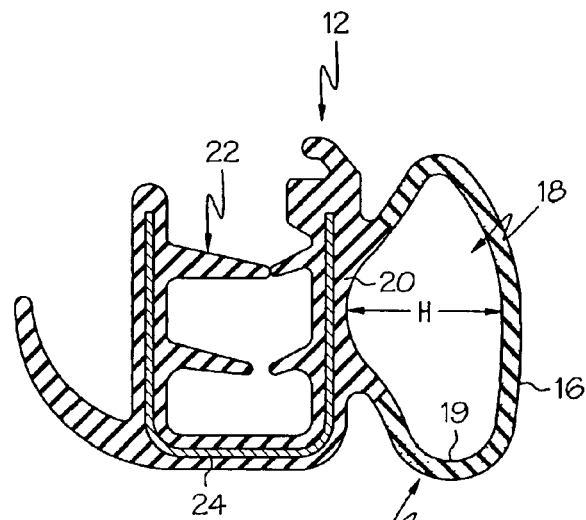
FIG. 7 is a sectional view of the sealing apparatus taken along section line 7—7 in FIG. 6.
Figure 8A:
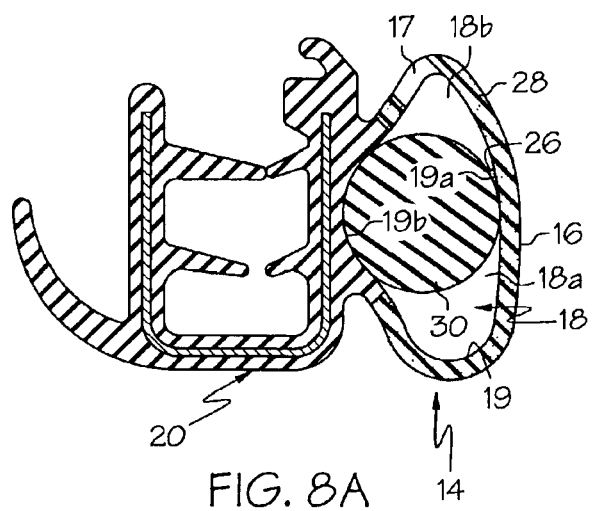
FIG. 8A is a sectional view of the sealing apparatus taken along section line 8A—8A in FIG. 6 wherein the bumper element is attached to the seal strip with an adhesive.

FIG. 7 is a sectional view of the body opening side seal apparatus 12 taken along section line 7—7 from FIG. 6. As illustrated in FIGS. 7 and 8A, the body opening side seal apparatus 12 comprises an elongated seal strip 14 and a bumper member including at least one bumper element 30. Although a single bumper element 30 is depicted in FIGS. 6 and 8A, exemplary embodiments may include a plurality of bumper elements. Moreover as best illustrated in FIGS. 4, 5A, 5B, 6 and 8A the bumper element 30 may be preformed prior to insertion of the bumper element 30 into the cavity 18. It is contemplated that the bumper element could alternatively be coextruded or otherwise formed simultaneously with the seal strip. Still further, material may be inserted into the cavity to thereafter form into a bumper. For example, a thermoplastic resin may be injected into the cavity at a predetermined location to thereafter form the bumper element.

The elongated seal strip 14 includes a flexible and resilient seal portion 16 and a base 20 defining a substantially hollow cavity 18. As best shown in FIGS. 7 and 8A, the cavity 18 is defined by a cavity boundary 19 that comprises an interior surface of the elongated seal strip 14. While a wide variety of materials and structural arrangements may be used for any of the flexible and resilient seal portions described throughout this specification, certain exemplary embodiments of the present invention include a foam (open or closed cell foam) comprising an ethylene-propylene-diene monomer (hereinafter "EPDM"). In an exemplary embodiment of the present invention, both the seal portion 16 and the base 20 comprise EPDM material. In a further exemplary embodiment of the present invention, the exterior of the seal portion 16 is covered with a high performance silicone coating to reduce friction and wear.

The base 20 of the elongated seal strip 14 includes one of a wide variety of available mounting structures. Certain exemplary mounting structures are depicted in the exemplary embodiments of the present invention shown in FIGS. 7 and 8A–8F. In one exemplary embodiment of the present invention, as shown in as FIGS. 7 and 8A–8B, an elongated seal strip 14 includes a base 20 having a clamp mounting structure. For example, the clamp mounting structure comprises a clamp fabricated from a composite structure comprising EPDM material with a reinforcing U-shaped metallic member 24. The U-shaped member 24 provides structural integrity to the elongated seal strip 14 while permitting adjustment of the shape of the elongated seal strip 14 during assembly. The clamp includes one or more fingers 22 adapted to cooperate with a flat end sheet of metal or other mounting surface. Although a wide variety of materials may be used, in an exemplary embodiment of the present invention, the U-shaped metallic member 24 comprises stainless steel and the surrounding material comprises solid EPDM material.

Figure 8B:
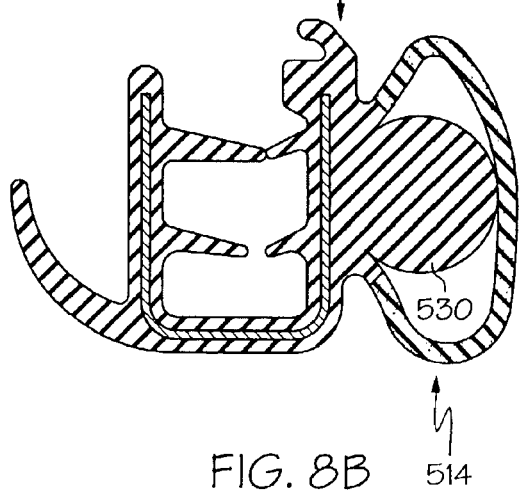
FIG. 8B is a sectional view of an alternate embodiment of a sealing apparatus similar to FIG. 8A except the bumper element is integral with the seal strip.
Figure 8C:
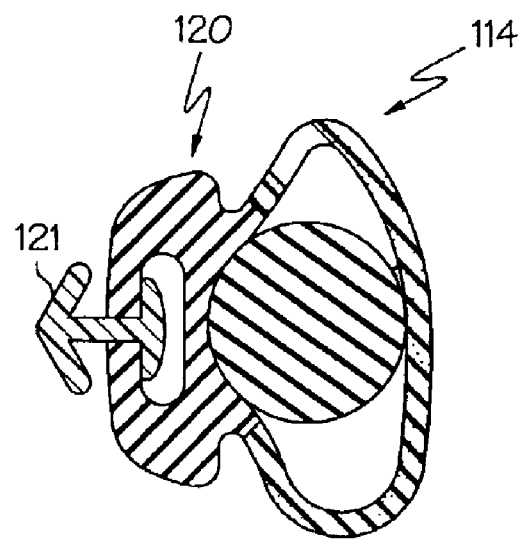
FIG. 8C is a sectional view of an alternate embodiment of a sealing apparatus similar to FIG. 8A except the mounting structure comprises a clip.

In another exemplary embodiment of the present invention, as shown in FIG. 8C, an elongated seal strip 114 includes a base 120 provided with one or more clips 121 as the mounting structure. If apertures for accepting such clip(s) are provided in the body of a vehicle, the elongated seal strip 114 having one or more clips 121 can be easily aligned and installed onto the vehicle by aligning the clip(s) 121 with the aperture(s).

Figure 8D:
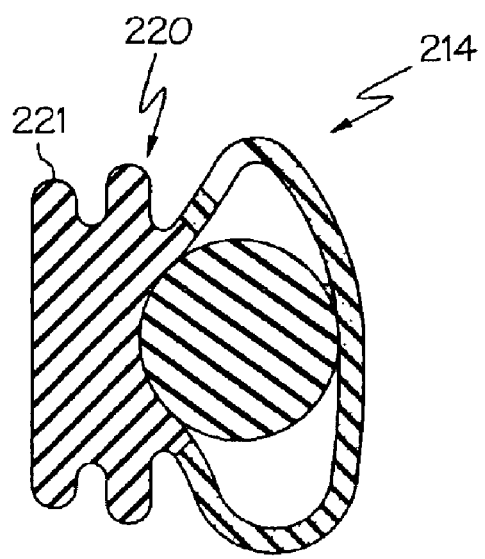
FIG. 8D is a sectional view of an alternate embodiment of a sealing apparatus similar to FIG. 8A except the mounting structure comprises a base adapted to be received in a retainer.

In yet another exemplary embodiment of the present invention, as depicted by FIG. 8D, an elongated seal strip 214 has a base 220 including a mounting structure 221 adapted to be received by a retainer. For example, as illustrated, the mounting structure 221 constitutes a tongue that is adapted to slide into a groove of a retainer (not shown), wherein the retainer is affixed to the body of a vehicle. The sliding relationship between the tongue and groove allows the position of the elongated seal strip 214 relative the body of the vehicle to be adjusted after the elongated seal strip 214 is mounted thereto.

Figure 8E:
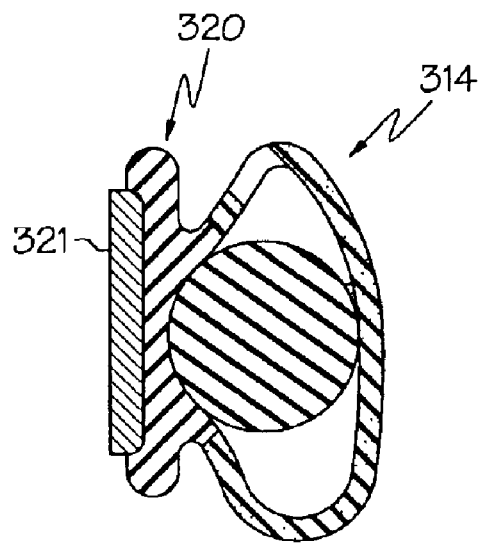
FIG. 8E is a sectional view of an alternate embodiment of a sealing apparatus similar to FIG. 8A except the mounting structure comprises a magnet.
Figure 8F:
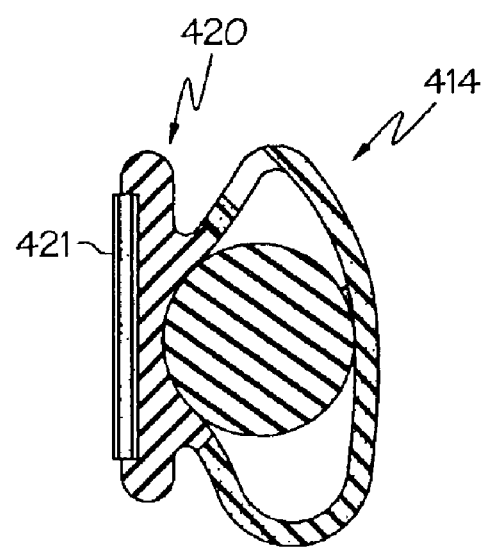
FIG. 8F is a sectional view of an alternate embodiment of a sealing apparatus similar to FIG. 8A except the mounting structure comprises double sided adhesive tape.

FIG. 8E illustrates yet another exemplary elongated seal strip 314 including a base 320 with a magnet 321 for removably connecting the elongated seal strip 314 to a ferrous metallic object, such as the body of a vehicle. FIG. 8F depicts a further exemplary elongated seal strip 414 including a base 420 provided with double sided adhesive foam tape 421 for mounting the elongated seal strip 414 to a vehicle body.

Each sealing apparatus in accordance with the present invention includes a bumper member within the cavity of an elongated seal strip, wherein the bumper member includes one or more bumper elements. A bumper element assists in preventing overslam of the vehicle door that would otherwise damage the vehicle door and/or the surrounding vehicle body. Furthermore, the bumper element minimizes vibrations that can otherwise propagate between the door and the vehicle body during vehicle operation. By placing the bumper element within the hollow cavity of the elongated seal strip, a vehicle manufacturer need not allocate the additional time, parts, and vehicular body space that would otherwise be required to incorporate one or more independent bumpers on the vehicle external and adjacent the elongated seal strip. By reducing the mounting space, the present invention allows a more compact package arrangement to provide a slim functional unit. Providing a compact package arrangement increases the vehicular body space available for alternative vehicle design arrangements.

As best illustrated in FIGS. 4, 5A, 5B, and 6, exemplary embodiments of the present invention include a bumper element 30 with a length that is substantially less than the longitudinal length of the elongated seal strip 14. Although other relative lengths may be used, exemplary embodiments include an elongated seal strip 14 with a length that is greater than twice the length of the bumper element 30. Providing the bumper element 30 with a length that is substantially less than the length of the elongated seal strip 14 provides a sufficient bumper function without extensively increasing the mechanical resistance in shutting the door. Although various lengths are appropriate for a bumper element 30, in an exemplary embodiment of the present invention, the bumper element 30 has a length of about 100 millimeters.

Although a bumper element may be formed from any resilient material, exemplary embodiments include a bumper element fabricated from solid EPDM material. Moreover, the bumper element can be constructed to have a higher spring constant than the seal portion to facilitate the bumper function. As illustrated, the bumper element can also have a substantially circular cross-section. In alternative embodiments, the cross-sectional shape of the bumper element can also be oval, triangular, rectangular, square or otherwise polygonal (e.g., including more than five sides). Although the cross-section of a bumper element can assume a variety of alternative diameters, the diameter can be increased as the cross-sectional area of the seal strip cavity increases in size. In exemplary embodiments, the cross-sectional diameter of the bumper element is about 9.2 millimeters.

In accordance with the present invention, it is desirable to attach or otherwise restrain a bumper element within the cavity of the elongated seal strip to maintain the bumper element at a predetermined position along the longitudinal length of the elongated seal strip. For example, the bumper element can be restrained within the cavity by attaching the bumper element to the elongated seal strip with an adhesive. In alternate exemplary embodiments, other structural arrangements are used to restrain the bumper element at a predetermined location within the cavity. For example, sonic welding may be used to melt a portion of the bumper element to the elongated seal strip. As another example, a heat element may be used to thermally activate a thermal adhesive at an attachment point between the bumper element and the elongated seal strip. Alternately, objects (e.g., set screws, cotter pins, etc.) may be used to key the bumper element into position relative to the elongated seal strip. Still further, a friction fit may be used to prevent or limit movement between the bumper element and elongated seal strip. The bumper element can also be straddled between two end caps secured to the elongated seal strip on each side of the bumper element to restrain the bumper element within the cavity. In an alternate exemplary embodiment of the present invention, as illustrated by FIG. 8B, a sealing apparatus 512 includes a bumper element 530 that is attached to the elongated seal strip 514 by being integral with the elongated seal strip 514. Although FIG. 8B depicts the bumper element 530 only being integral with the base, it is understood that the bumper element 530 may alternatively be only integral with the seal portion or integral with both the base and the seal portion. However, manufacture can be simplified by attachment of the bumper element 530 to only one of the base and the seal portion. Furthermore, in certain circumstances, attachment of the bumper member 530 to only one of the base and the seal portion may increase the flexibility of the seal portion and therefore enhance the seal between the seal strip and the corresponding vehicle body structure. An integral bumper element 530 is formed, for example, by co-extruding the bumper element 530 with the elongated seal strip 514. In still other examples, the bumper element may be encapsulated during formation of the elongated seal strip.

FIG. 8A illustrates one exemplary embodiment of the present invention wherein an adhesive 26 is used to attach the bumper element 30 to the elongated seal strip 14. While the adhesive 26 attaches the bumper element 30 to the seal portion 16 of the seal strip 14, the bumper element 30 can alternatively be attached to the base 20. Moreover, while the bumper element 30 is illustrated as being attached to only one of the base 20 and the flexible seal portion 16, it is contemplated that the bumper element 30 can be attached to both the base 20 and flexible seal portion 16. However, manufacture can be simplified by attachment of the bumper element 30 to only one of the base 20 and the flexible seal portion 16. Furthermore, in certain circumstances, attachment of the bumper member 30 to only one of the base 20 and the seal portion 16 may increase the flexibility of the seal portion 16 and therefore enhance the seal between the seal strip 14 and the corresponding vehicle body structure. When a wall 28 of the seal portion 16 at least partially defines the cavity 18 and includes one or more longitudinally spaced apertures 17 to communicate with the cavity 18, an adhesive applicator may be inserted through one or more of the apertures 17 adjacent a bumper element 30 in order that adhesive 26 may be injected to attach the bumper element 30 to the seal portion 16. If no aperture 17 is present near the desired location of the bumper element 30, adhesive may be injected into the cavity 18 by means of a syringe or other such device.

As depicted in FIG. 7, the cavity 18 includes a cavity height "H" when the seal portion 16 is in an uncompressed orientation. In an exemplary embodiment of the present invention, the bumper element 30 includes a dimension (see FIG. 8A) that extends substantially the full cavity height when the seal is in the uncompressed orientation. Accordingly, the bumper element can extend to a position closely adjacent the other of the base and the flexible seal portion when the flexible seal portion is in the uncompressed orientation. For example, as depicted by FIG. 8A, the bumper element 30 is attached to the elongated seal strip 14 at an attachment location 19a of the cavity boundary 19. The cross-sectional surface of the bumper 30 extends from the attachment location 19a to a position closely adjacent (e.g., touching) another location 19b of the cavity boundary 19 to divide the cavity 18 into a first cavity portion 18a and a second cavity portion 18b. Extending the bumper element in this fashion provides adequate shock absorbing characteristics while also permitting the sealing apparatus to perform its sealing function.

As best illustrated in FIGS. 2 and 3, the right rear door 104 includes an upper latch 112 and corresponding upper striker 110 (see FIG. 2) and a lower latch 212 and corresponding lower striker 210 (see FIG. 3). In an exemplary embodiment of the present invention, as illustrated in FIG. 2, the body opening side seal apparatus 12 includes at least one bumper element 30 located adjacent the upper striker 110. The bumper element 30 is also located adjacent the upper latch 112 when the right rear door 104 is substantially closed. In a more exemplary embodiment of the present invention, as shown in FIGS. 2 and 3, the right rear door 104 also includes a door side seal apparatus 40 for further sealing the periphery of the door 104. As illustrated in FIG. 3, the door side seal apparatus 40 includes at least one lower bumper element 42 located adjacent the lower latch 212. When the right rear door 104 is substantially closed, the lower bumper element 42 is also located adjacent the lower striker 210. Because the impact force of a slamming door tends to be highest near the latch and striker, the bumper and sealing functions of the door are enhanced by locating the upper and lower bumper elements 30, 42 adjacent at least one of the upper and lower latch/striker assemblies. These one or more bumper elements appropriately placed will absorb the impact of a door closure by deflecting an amount sufficient to enable the door to close such that the latch properly engages the striker. In an exemplary embodiment of the present invention, the bumper element has a diameter of 9.2 millimeters and is configured to deflect 1.2 millimeters upon closure of the door.

Figure 4:
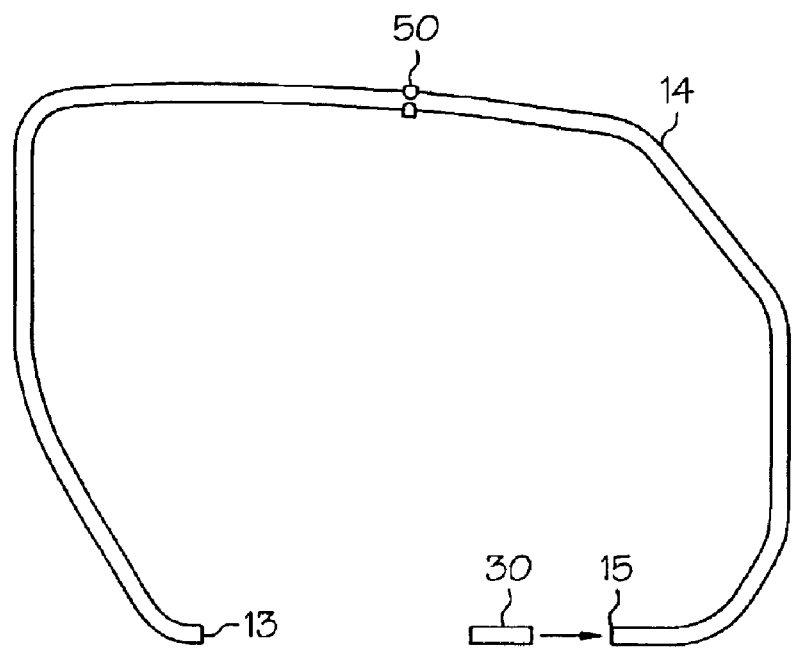
FIG. 4 is illustrates a bumper element and an elongated seal strip prior to assembly of the sealing apparatus.
Figure 5A:
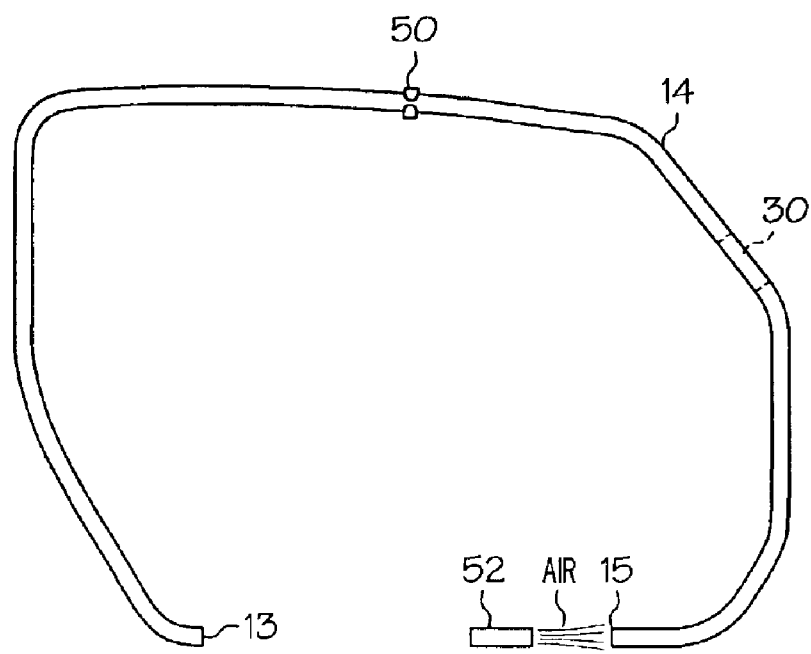
FIG. 5A illustrates an exemplary device used to move the bumper element within the cavity to a predetermined position relative to the elongated seal strip.
Figure 5B:
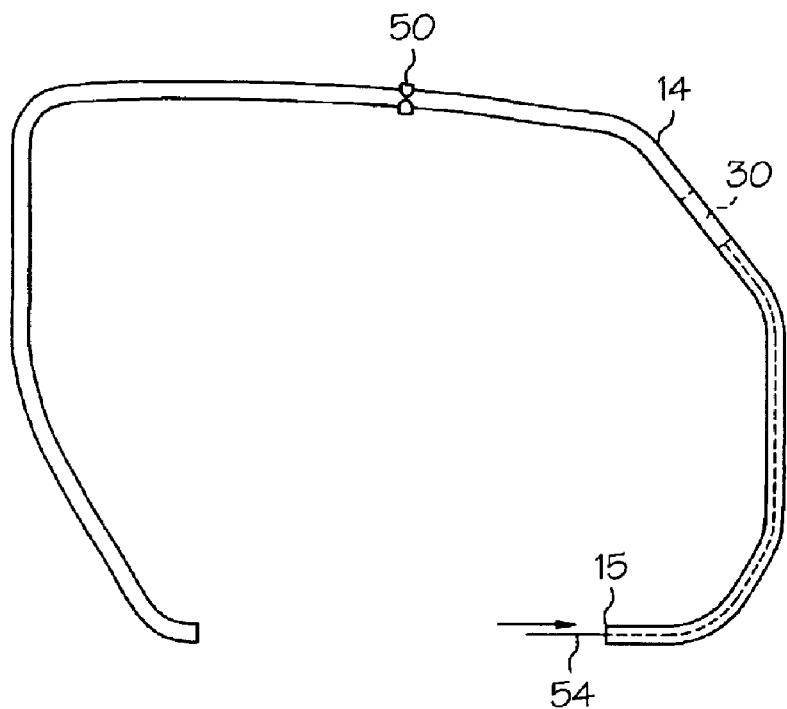
FIG. 5B illustrates an alternative exemplary device used to move the bumper element within the cavity to a predetermined position relative to the elongated seal strip.

FIGS. 4, 5A, and 5B illustrate method steps of making a body opening side seal apparatus 12 illustrated in FIG. 6. In an exemplary embodiment of the present invention, as illustrated in FIG. 4, for example, a clamp 50 or other biasing device is used as a stop to assist in locating the bumper element 30 within the cavity 18 at a predetermined position relative to the elongated seal strip 14. For example, the clamp 50 can at least partially compress the flexible seal portion 16 to at least partially close the hollow cavity 18 such as to permit air passage but to impede further travel of the bumper element 30 within the cavity.

In one embodiment of making the body opening side seal apparatus 12 of FIG. 6, the preformed bumper element 30 is inserted into the cavity 18 through a first end 15 of the elongated seal strip 14. A fluid pressure differential is then applied within the cavity to move the bumper element 30 to the predetermined position relative to the elongated seal strip 14. For example, a source of pressurized air 52 can be introduced into the cavity 18 through the first end 15 to assist in pushing the bumper element 30 to the predetermined location along the longitudinal length of the elongated seal strip 14. In other exemplary embodiments of the present invention, a vacuum is applied to the second end 13 of the elongated seal strip to create a pressure differential that pulls the bumper element 30 into place.

In an alternate embodiment of the present invention, as shown in FIG. 5B, a bumper element 30 is pushed to a predetermined location along the longitudinal length of the elongated seal strip 14 with an elongated push member 54. Examples of an appropriate push member 54 include a flexible filament, snaking device, flexible wire or the like. Although not shown, it is also contemplated that the elongated seal strip may have an opening, such as a slit, to permit insertion of the bumper element into the cavity without first inserting the bumper element into the cavity from either the first end 15 or the second end 13 of the elongated seal strip 14.

The foregoing description of the various embodiments of the invention has been presented for the purposes of illustration and description. It is not intended to be exhaustive or to limit the invention to the precise form disclosed. Many alternatives, modifications and variations will be apparent to those skilled in the art. Accordingly, this invention is intended to embrace all alternatives, modifications and variations that have been discussed herein, and others that fall within the spirit and broad scope of the claims.

What is claimed is:

1. A sealing apparatus for a closure comprising:
   a) an elongated seal strip including a first end, a second end, a longitudinal length, a base, and a flexible and resilient seal portion, the base and the seal portion defining a substantially hollow cavity extending between the first and second ends, the base providing an arcuately-shaped depression within the cavity; and
   b) preformed bumper element having a length substantially less than the longitudinal length, the preformed bumper element being is located entirely within the cavity between the first and second ends and being is restrained within the cavity after the preformed bumper element is located adjacent a predetermined position along the longitudinal length of the seal strip through insertion of the preformed bumper element into the cavity, the preformed bumper element having a substantially circular cross-sectional shape that contacts the depression in a substantially complementary relationship when the preformed bumper element is located adjacent the predetermined position.

2. The sealing apparatus of claim 1, wherein the preformed bumper element is restrained by attaching the preformed bumper element to the elongated seal strip adjacent the predetermined position.

3. The sealing apparatus of claim 2, wherein the seal portion includes a wall that at least partially defines the cavity and an aperture extending through the wall to communicate with the cavity, wherein the aperture is adapted to assist in attaching the preformed bumper element to the elongated seal strip.

4. The sealing apparatus of claim 2, wherein the preformed bumper element is attached to the elongated seal strip at an attachment location of a boundary of the cavity and extends to a position closely adjacent another location of the cavity boundary to substantially divide the cavity into a first cavity portion and a second cavity portion.

5. The sealing apparatus of claim 1, wherein the cavity has a cavity height when the seal portion is in an uncompressed orientation, the preformed bumper element including a dimension which extends substantially the full cavity height when the seal portion is in the uncompressed orientation.

6. The sealing apparatus of claim 1, wherein the length of the elongated seal strip is greater than twice the length of the preformed bumper element.

7. The sealing apparatus of claim 1, wherein the preformed bumper element has a higher spring constant than the seal portion.

8. The sealing apparatus of claim 1 wherein the preformed bumper element includes a dimension which extends substantially the full cavity height when the seal portion is in an uncompressed orientation, the preformed bumper element being substantially undeformed from its manufactured shape when the seal portion is in an uncompressed orientation.

9. A sealing apparatus comprising:
   a) an elongated seal strip including a first end, a second end, a longitudinal length, a base, and a flexible and resilient seal portion, the base and the seal portion defining a substantially hollow cavity extending between the first and second ends, the cavity including an internal surface area; and b) a bumper element being formed separately from the seal strip and being positioned in the cavity adjacent a predetermined position alone the longitudinal length of the seal strip, the bumper element having a length substantially less than the longitudinal length, the bumper element being located entirely within the cavity between the first and second ends such that the seal strip and the bumper element are coextensive alone a first portion of the longitudinal length, the bumper element having an external surface area being less than the internal surface area of the cavity alone the entire first portion.

10. The sealing apparatus of claim 9, wherein the bumper element extends to a position closely adjacent the base and the flexible seal portion when the flexible seal portion is in the uncompressed orientation.

11. The sealing apparatus of claim 9, wherein the bumper element has a length substantially less than the longitudinal length of the seal strip.

12. The sealing apparatus of claim 11, wherein the length of the elongated seal strip is greater than twice the length of the bumper element.

13. The sealing apparatus of claim 9, wherein the bumper element has a higher spring constant than the seal portion.

14. The sealing apparatus of claim 9, wherein the bumper element has a substantially circular cross-sectional shape.

15. The sealing apparatus of claim 9, wherein the bumper element includes a dimension which extends substantially the full cavity height when the seal portion is in an uncompressed orientation, the bumper element being substantially undeformed from its manufactured shape when the seal portion is in an uncompressed orientation.

16. A sealing apparatus for a closure comprising:
a) an elongated seal strip including a first end, a second end, a longitudinal length, a base, and a flexible and resilient seal portion, the base and the seal portion defining a substantially hollow cavity extending between the first and second ends; and
b) a bumper element having a length substantially less than the longitudinal length, the bumper element being located entirely within the cavity between the first and second ends and being restrained within the cavity adjacent a predetermined position along the longitudinal length of the seal strip, the bumper element having a cross-sectional shape having a outer surface that contacts the base in a is substantially complementary relationship when the preformed bumper element is located adjacent the predetermined position.

17. The sealing apparatus of claim 16, wherein the bumper element is restrained by attaching the bumper element to the elongated seal strip adjacent the predetermined position.

18. The sealing apparatus of claim 17, wherein the seal portion includes a wall that at least partially defines the cavity and an aperture extending through the wall to communicate with the cavity, wherein the aperture is adapted to assist in attaching the bumper element to the elongated seal strip.

19. The sealing apparatus of claim 17, wherein the bumper element is attached to the elongated seal strip at an attachment location of a boundary of the cavity and extends to a position closely adjacent another location of the cavity boundary to substantially divide the cavity into a first cavity portion and a second cavity portion.

20. The sealing apparatus of claim 16, wherein the cavity has a cavity height when the seal portion is in an uncompressed orientation, the bumper element including a dimension which extends substantially the full cavity height when the seal portion is in the uncompressed orientation.

21. The sealing apparatus of claim 16, wherein the length of the elongated seal strip is greater than twice the length of the bumper element.

22. The sealing apparatus of claim 16, wherein the bumper element has a higher spring constant than the seal portion.

23. The sealing apparatus of claim 16, wherein the bumper element has a substantially circular cross-sectional shape.

24. The sealing apparatus of claim 16, wherein the bumper element includes a dimension which extends substantially the full cavity height when the seal portion is in an uncompressed orientation, the bumper element being substantially undeformed from its manufactured shape when the seal portion is in an uncompressed orientation.

* * * * *

UNITED STATES PATENT AND TRADEMARK OFFICE
CERTIFICATE OF CORRECTION

PATENT NO. : 6,877,279 B2
DATED : April 12, 2005
INVENTOR(S) : Russell et al.

It is certified that error appears in the above-identified patent and that said Letters Patent is hereby corrected as shown below:

Column 8,
Line 15, before "preformed" insert -- a --.
Line 17, after "being" delete "is".
Line 18, after "being" delete "is".

Column 9,
Lines 3, 8 and 11, change "alone" to -- along --.

Column 10,
Line 2, after "shape having", change "a" to -- an --.
Line 3, after "a" delete "is".

Signed and Sealed this

Twenty-first Day of June, 2005

JON W. DUDAS
*Director of the United States Patent and Trademark Office*